(12) United States Patent
Winkler et al.

(10) Patent No.: US 11,458,854 B2
(45) Date of Patent: Oct. 4, 2022

(54) MULTIFUNCTIONAL UTILITY BOX WITH DISPLAY AND VEHICLE CHARGING STATION

(71) Applicant: Winkler Outdoor, LLC, Dana Point, CA (US)

(72) Inventors: Marvin J. Winkler, Dana Point, CA (US); Chad A. Hagle, Sherman Oaks, CA (US)

(73) Assignee: Winkler Outdoor, LLC, Dana Point, CA (US)

( * ) Notice: Subject to any disclaimer, the term of this patent is extended or adjusted under 35 U.S.C. 154(b) by 0 days.

(21) Appl. No.: 16/555,958

(22) Filed: Aug. 29, 2019

(65) Prior Publication Data

US 2019/0389323 A1    Dec. 26, 2019

Related U.S. Application Data

(63) Continuation of application No. 16/378,217, filed on Apr. 8, 2019.

(60) Provisional application No. 62/728,984, filed on Sep. 10, 2018, provisional application No. 62/655,015, filed on Apr. 9, 2018.

(51) Int. Cl.
| | |
|---|---|
| *H02J 7/00* | (2006.01) |
| *B60L 53/30* | (2019.01) |
| *H02G 3/08* | (2006.01) |
| *H04W 88/08* | (2009.01) |

(52) U.S. Cl.
CPC .......... *B60L 53/305* (2019.02); *H02G 3/081* (2013.01); *H04W 88/08* (2013.01)

(58) Field of Classification Search
CPC .................................................. B60L 53/305

USPC ......................................................... 320/109
See application file for complete search history.

(56) References Cited

U.S. PATENT DOCUMENTS

| | | | | |
|---|---|---|---|---|
| 8,963,481 | B2* | 2/2015 | Prosser | B60L 1/006 320/104 |
| 8,983,875 | B2* | 3/2015 | Shelton | G06Q 40/12 705/412 |
| 2013/0026971 | A1* | 1/2013 | Luke | B60L 1/02 320/104 |
| 2013/0030920 | A1* | 1/2013 | Wu | B60L 1/02 705/14.64 |

(Continued)

OTHER PUBLICATIONS

Margaret Rouse, Electronic Paper Display (EPD), webpage <www.whatis.techtarget/definition/electronic-paper-display-edp>, accessed Jul. 29, 2019, 3 pages.

(Continued)

*Primary Examiner* — Yalkew Fantu
(74) *Attorney, Agent, or Firm* — Stetina Brunda Garred and Brucker

(57) ABSTRACT

A system for providing a multifunctional utility box includes a utility box for housing and providing access to utility equipment and an electronic display disposed on a first surface from among one or more external surfaces of the utility box. The utility box is fixed at an outdoor location and the one or more external surfaces enclose an interior cavity containing the utility equipment. The system further includes a wireless router configured to provide a WiFi hotspot centered at the utility box. The system further uses the power provided to utility boxes to power a charging rack for vehicles separately or in combination with the electronic display.

16 Claims, 11 Drawing Sheets

(56) References Cited

U.S. PATENT DOCUMENTS

| | | | |
|---|---|---|---|
| 2013/0193918 A1* | 8/2013 | Sarkar | B60L 53/51 |
| | | | 320/109 |
| 2013/0254097 A1* | 9/2013 | Marathe | G07F 15/005 |
| | | | 705/39 |
| 2014/0143578 A1* | 5/2014 | Cenizal | H04B 3/54 |
| | | | 713/340 |

OTHER PUBLICATIONS

Laura Bliss, The Hot New Thing in Dockless Electric Scooters: Docks, webpage <https://www.bloomberg.com/news/articles/2019-03-13/a-fix-for-electric-scooter-sidewalk-chaos-solar-docks>, Mar. 13, 2019, 6 pages.

Swiftmile, Swiftmile Autonomous Charging Platform, webpage <https://www.swiftmile.com/index.html>, accessed Aug. 1, 2019, 6 pages.

* cited by examiner

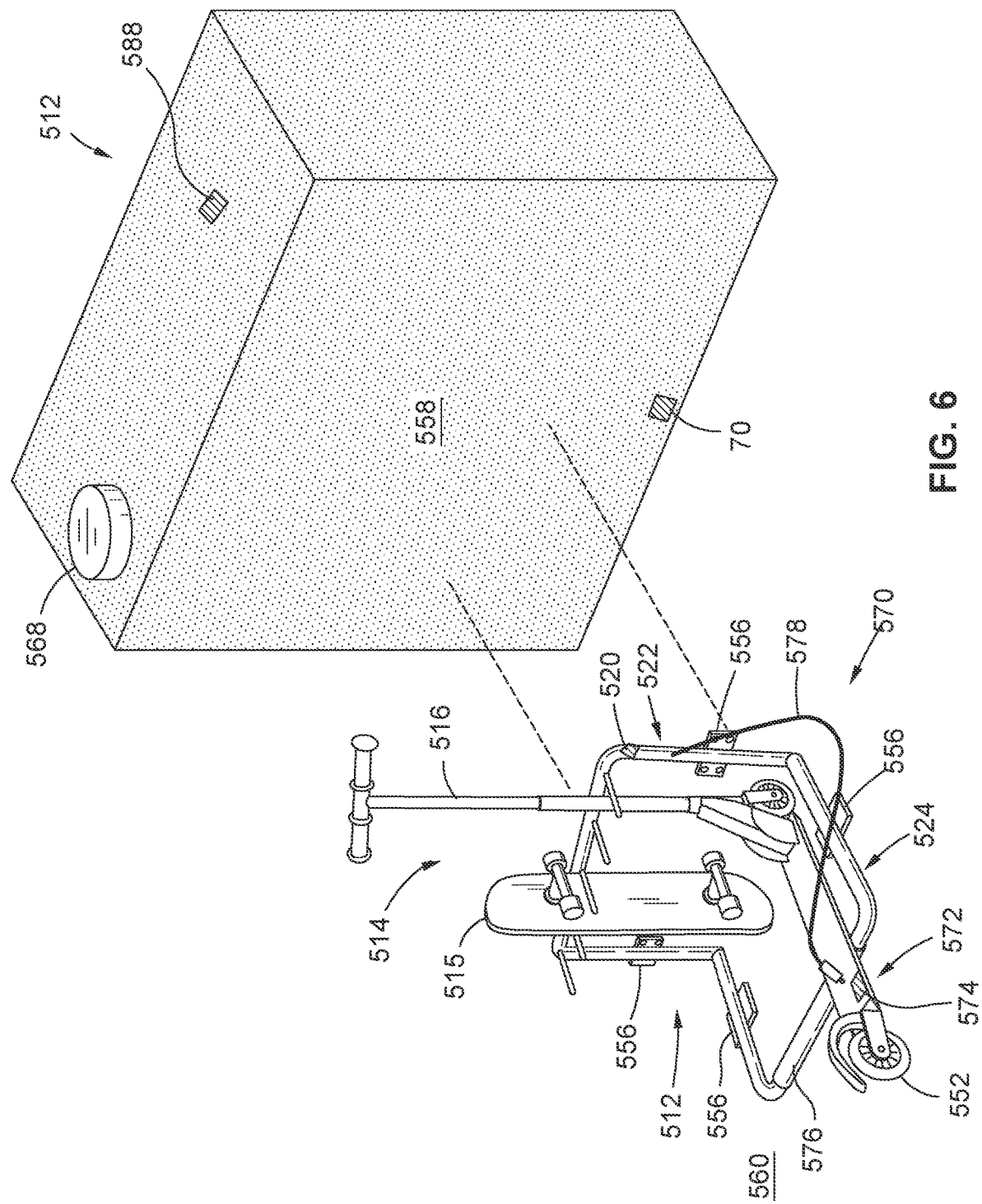

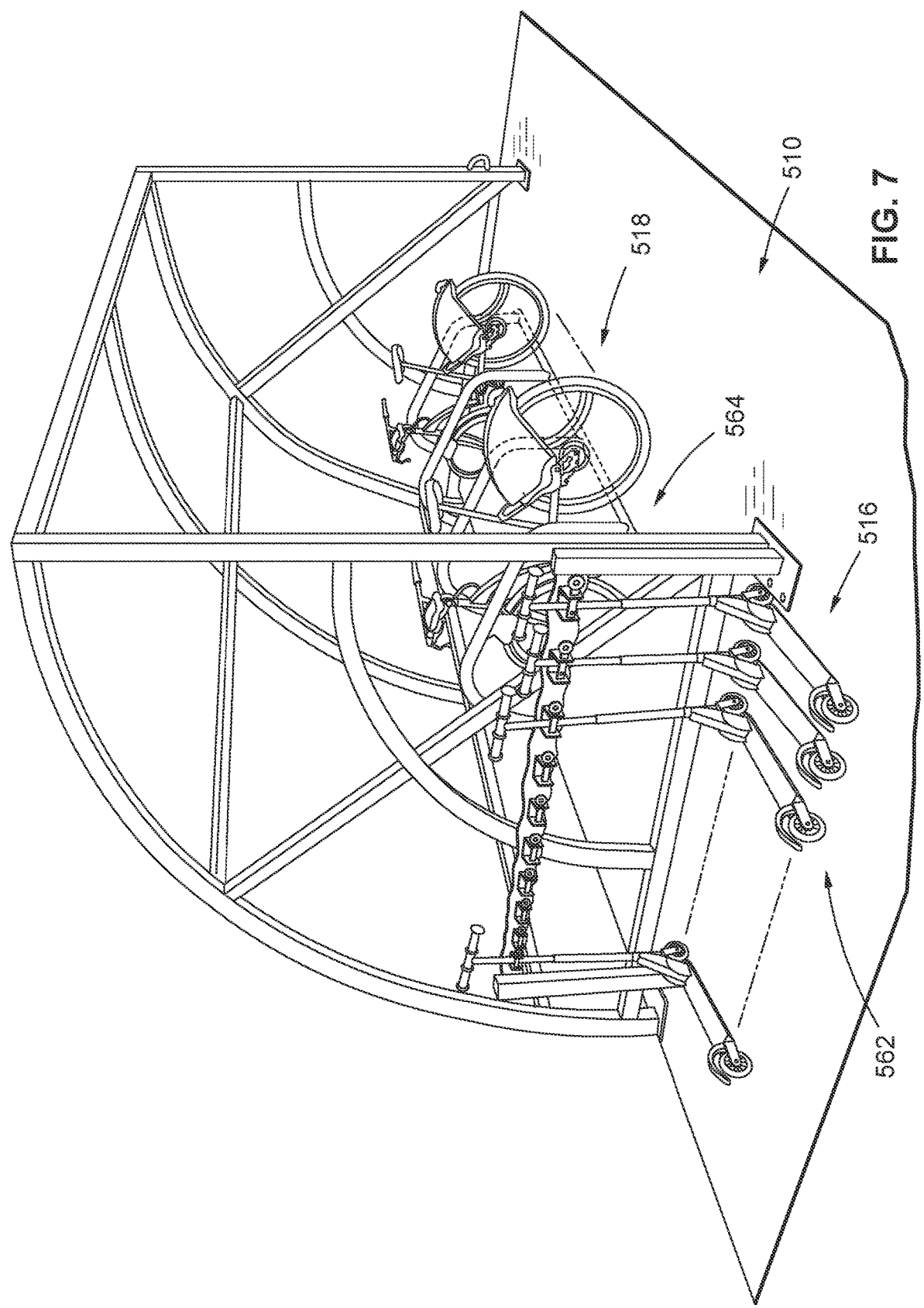

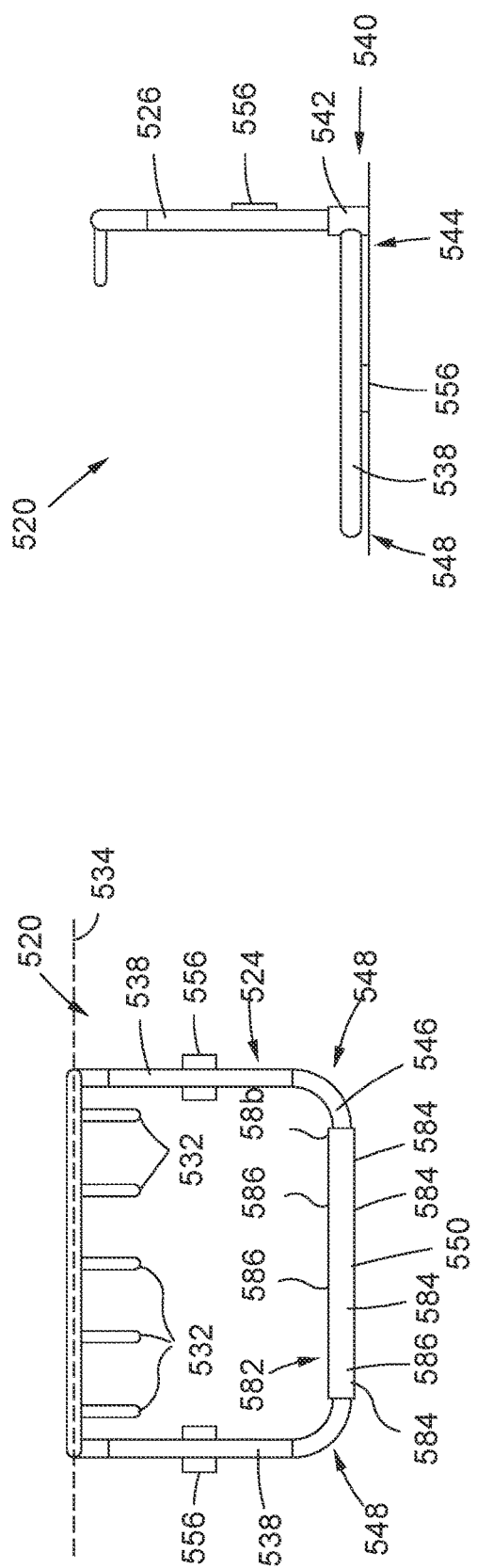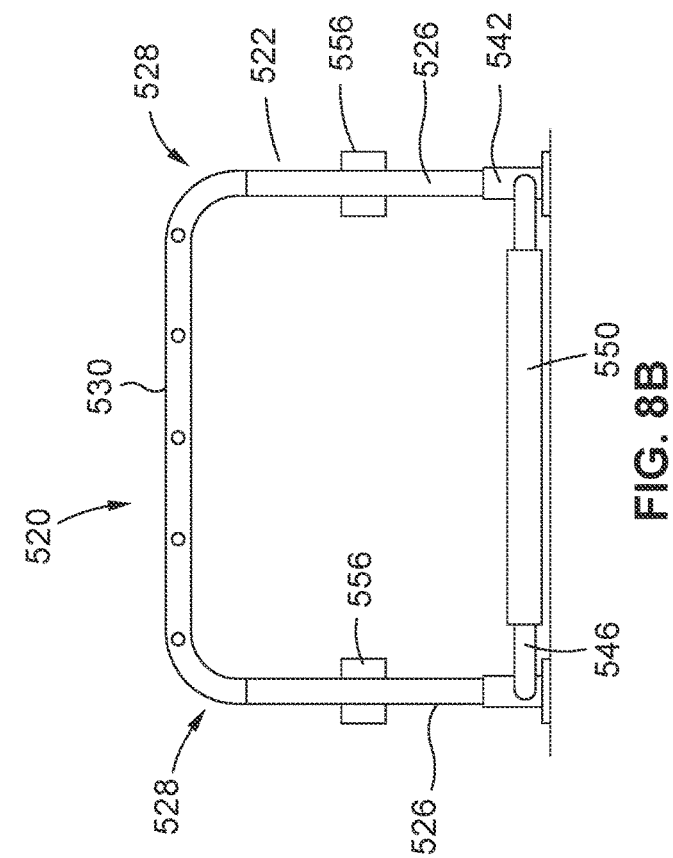

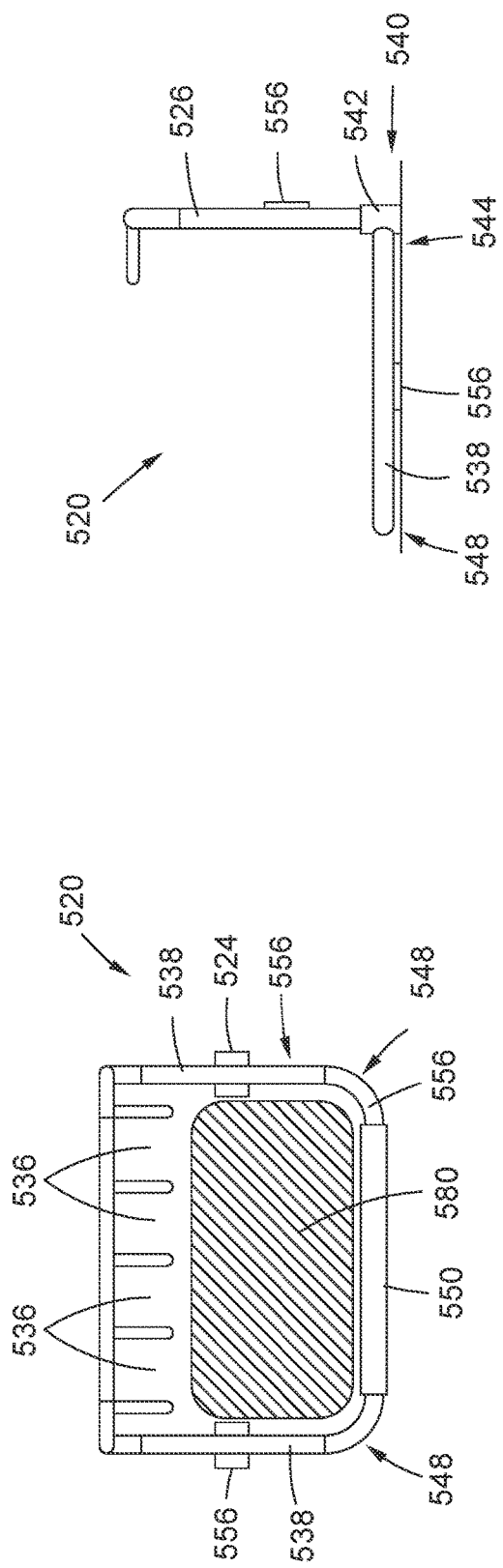
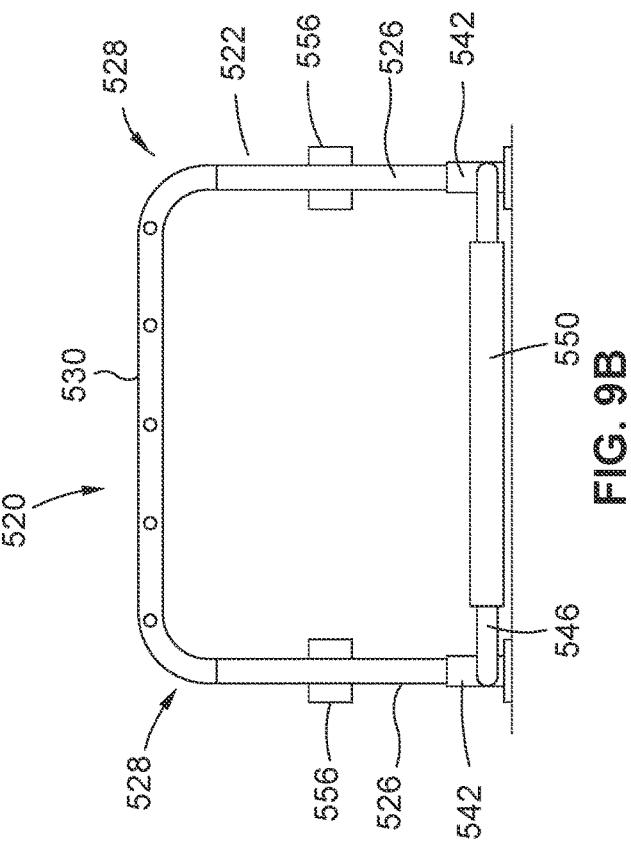
FIG. 9A
FIG. 9B
FIG. 9C

MULTIFUNCTIONAL UTILITY BOX WITH DISPLAY AND VEHICLE CHARGING STATION

CROSS-REFERENCE TO RELATED APPLICATIONS

The present invention is a continuation-in-part of U.S. patent application Ser. No. 16/378,217, filed Apr. 8, 2019 and entitled "Multifunctional Utility Box with Electronic Paper Display and Vehicle Charging Station," which relates to and claims priority to provisional patent application Ser. No. 62/655,015 filed Apr. 9, 2018 entitled "Multifunctional Utility Box with Electronic Paper Display" and provisional patent application Ser. No. 62/728,984 filed Sep. 10, 2018 entitled "Multifunctional Utility Box with Electronic Paper Display and Vehicle Charging Station", the disclosures of which are expressly incorporated herein by reference.

STATEMENT RE: FEDERALLY SPONSORED RESEARCH/DEVELOPMENT

Not Applicable

BACKGROUND

Over 30,000 locations in Los Angeles County alone feature city-owned utility boxes such as traffic signal cabinets. When privately owned utility boxes are considered, such as those containing communications infrastructure, the total number of utility boxes is even greater. Nearly every city block contains one or more such utility boxes that pedestrians walk by every day. Unfortunately, utility boxes are all too often the targets of graffiti and other vandalism, creating an eyesore and detracting from the beauty of public spaces. Such vandalism costs local municipalities and utility companies millions of dollars every year.

Moreover, such utility boxes have power to them. Currently, the power is only used for the functions performed by the utility box, for example, provision of power to, and control of, traffic signals. At the same time, alternative means of transportation are being used in various cities, and particularly in downtown areas. Of these alternative means, scooters and bicycles which are powered by electric motors have proven particularly popular. These vehicles offer the advantage of having no emission because of their electric motors. However, they do require the recharging of their batteries on a regular basis. In most cases, these vehicles are rented for a limited period of time, often a day or less. It is often not convenient for a renter to return a vehicle to a central location. However, it is required that any return location also have the ability to charge the returned vehicles. Thus, an opportunity exists to tap the power present at the utility boxes at most intersections to provide power for vehicle charging.

BRIEF SUMMARY

The present disclosure contemplates various systems, methods, and apparatuses for overcoming the above drawbacks accompanying the related art. One aspect of the embodiments of the present disclosure is a system for providing a multifunctional utility box. The system includes a utility box for housing and providing access to utility equipment, the utility box being fixed at an outdoor location and including one or more external surfaces enclosing an interior cavity containing the utility equipment. The system further includes an electronic display disposed on a first surface from among the one or more external surfaces.

The system may include a wireless router configured to provide a WiFi hotspot centered at the utility box. The wireless router may be disposed within the interior cavity of the utility box. The wireless router may include one or more antenna elements that protrude from the interior cavity of the utility box.

The electronic display may receive power from a power source disposed within the interior cavity of the utility box.

Another aspect of the embodiments of the present disclosure is a method of providing a multifunctional utility box. The method includes disposing an electronic display on a first surface from among one or more external surfaces of a utility box that houses and provides access to utility equipment. The utility box may be fixed at an outdoor location and the one or more external surfaces enclose an interior cavity containing the utility equipment.

The method may include configuring a wireless router to provide a WiFi hotspot centered at the utility box. The method may include disposing the wireless router within the interior cavity of the utility box. The method may include disposing one or more antenna elements of the wireless router to protrude from the interior cavity of the utility box.

The electronic display may receive power from a power source disposed within the interior cavity of the utility box.

Disclosed is a modular system for advertising and/or vehicle rental. The system draws power from power provided to utility boxes at intersections with electronic traffic signals. The power may be used to power an electronic display module, which may include advertising displayed thereon. Alternatively, or in combination with an electronic display module, the power may be further used to power a charging rack for vehicles. The vehicles may include scooters and bicycles. The charging may be accomplished by plugging in vehicles to the charging rack and charging the battery in the vehicle through the corded connection, or may be charged wirelessly through induction charging. The charging rack may include architecture which allows for the rental of the vehicles directly from the charging rack. The charging rack may have a locking mechanism which may be controlled by software, including a smartphone application. The application may be used to rent a vehicle and unlock it form the rack. The app may also be used to return the vehicle, ending the rental by placing the vehicle in the rack. The charging rack may include several sensors which may help determine the presence of any vehicle in the charging rack, or a particular type of vehicle, for example, a scooter or a bicycle, or to determine if a particular vehicle is in the proximity of the rack.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 6 shows a perspective view of one embodiment of the multifunctional utility box system including the utility box and charging rack;

FIG. 7 shows a perspective view of an embodiment of the charging rack including a first section for scooters, and a second section for bicycles;

FIG. 8A shows a top plan view of the embodiment of the charging rack from FIG. 6;

FIG. 8B shows a front plan view of the embodiment of the charging rack from FIG. 6;

FIG. 8C shows a side plan view of the embodiment of the charging rack from FIG. 6;

FIG. 9A shows a top plan view of another embodiment of the charging rack;

FIG. 9B shows a front plan view of another embodiment of the charging rack;

FIG. 9C shows a side plan view of another embodiment of the charging rack;

DETAILED DESCRIPTION

The present disclosure encompasses various embodiments of systems and methods for providing a multifunctional utility box. The detailed description set forth below in connection with the appended drawings is intended as a description of the several presently contemplated embodiments of these methods, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
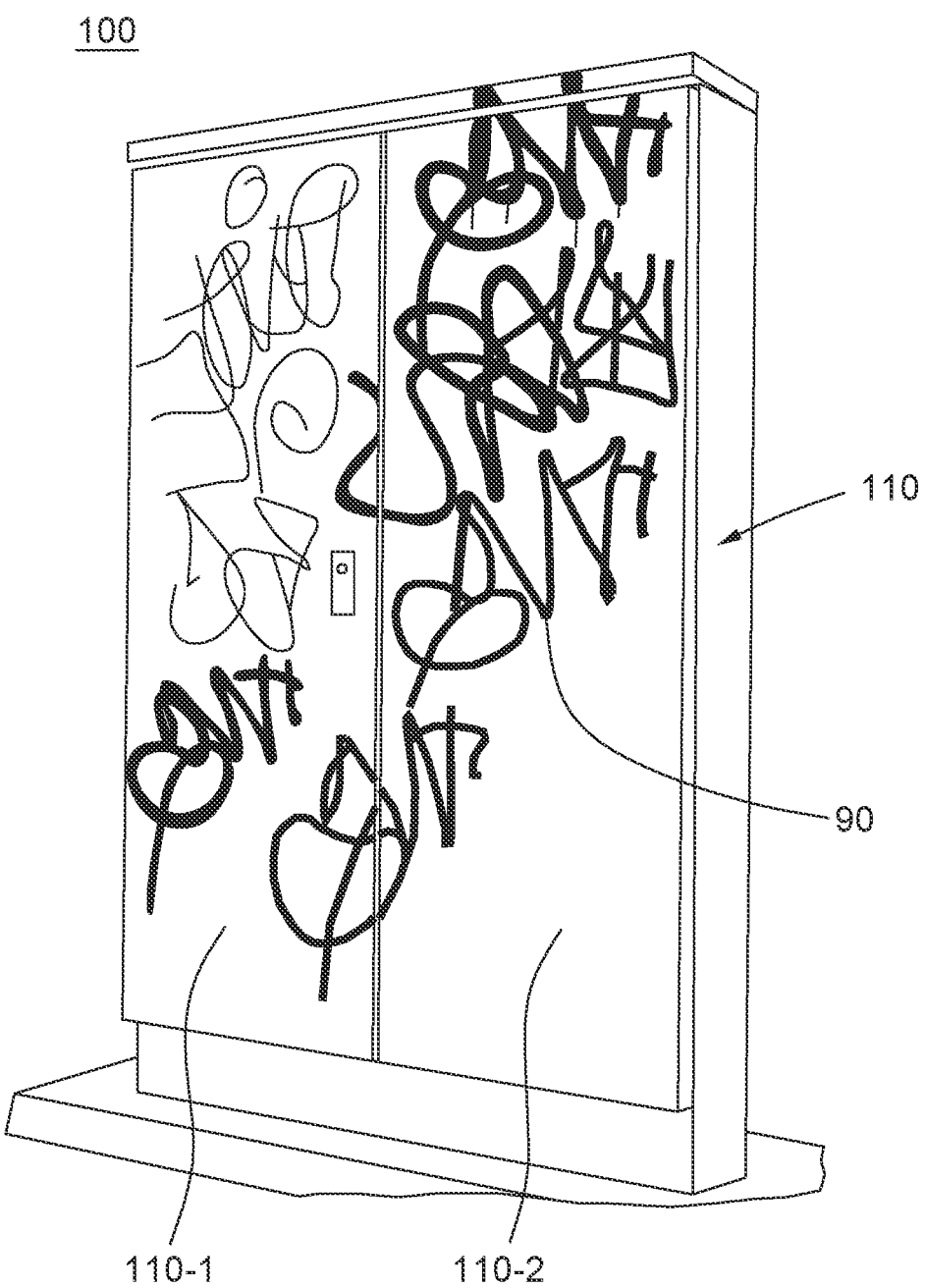
FIG. 1 shows a utility box on a sidewalk adjacent to a city intersection.

FIG. 1 shows a utility box 100 on a sidewalk adjacent to a city intersection. The utility box 100 houses and provides access (e.g. via hinged doors 110-1, 110-2) to utility equipment. In the example of FIG. 1, the utility box 100 is a typical city-owned traffic signal cabinet, which houses electrical equipment for controlling a traffic signal of the intersection. The utility box 100 is fixed to the sidewalk and includes a plurality of external surfaces 110 (generally indicated by the arrow in FIG. 1) including the outer surfaces of the doors 110-1, 110-2, a back surface on the opposite side of the utility box 100 from the doors 110-1, 110-2, side surfaces, and a top. The external surfaces 110 enclose an interior cavity containing the utility equipment. As can be seen, the utility box 100 has been defaced with graffiti 90.

Figure 2:
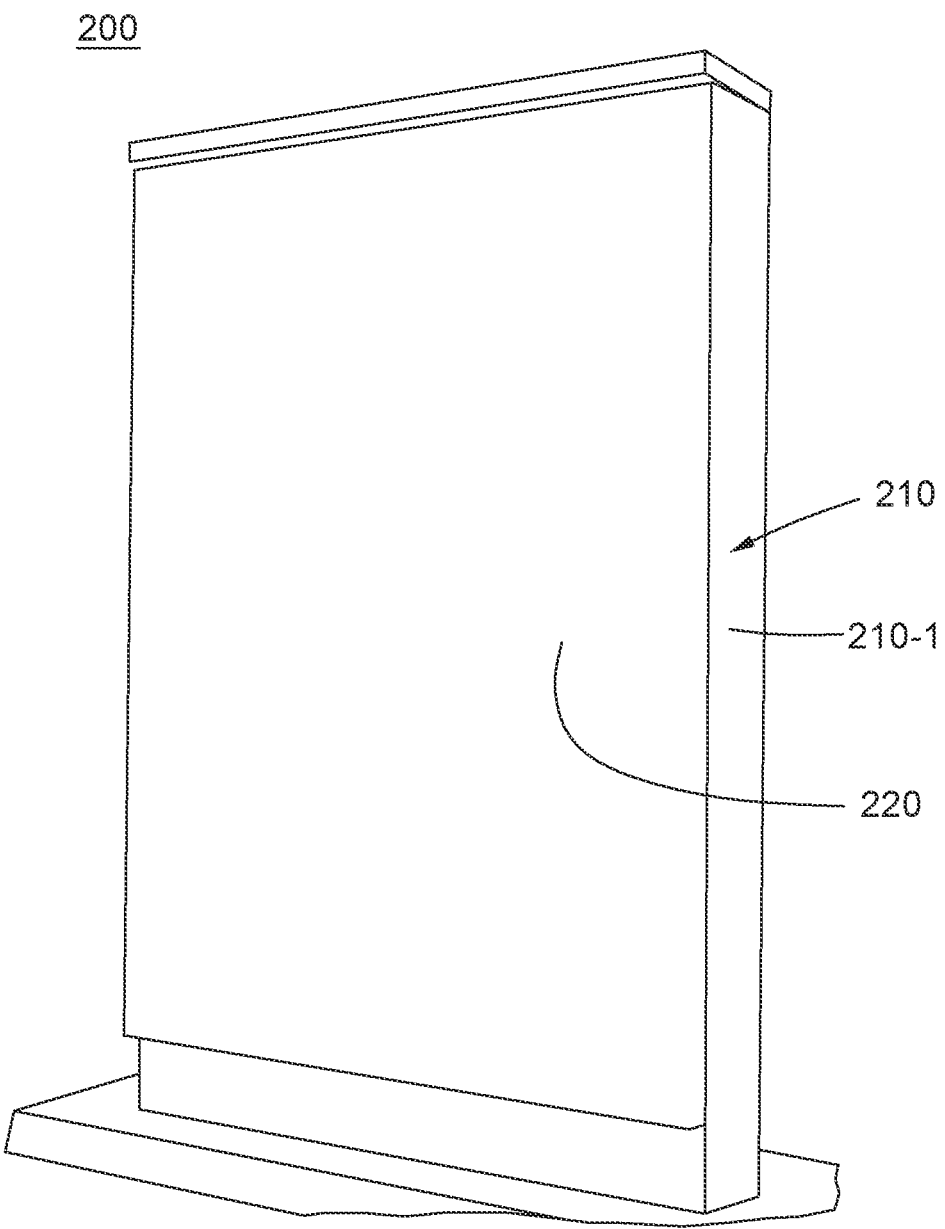
FIG. 2 shows the same view as FIG. 1 but with the utility box replaced with an improved utility box according to an embodiment of the present disclosure.

FIG. 2 shows the same view as FIG. 1 but with the utility box 100 replaced with an improved utility box 200 according to an embodiment of the present disclosure. The utility box 200 may be the same as the utility box 100, including a plurality of external surfaces 210 that are the same as the external surfaces 110 and similarly enclose an interior cavity containing utility equipment, except that, in the case of the utility box 200, an electronic display 220 is disposed on a first surface 210-1 of the plurality of external surfaces 210. In FIG. 2, the electronic display 220 is represented by the white area on the first surface 210-1 of the utility box 200, where the doors 110-1, 110-2 of the utility box 100 were located in the example of FIG. 1. However, it is contemplated that the same utility box 100 of FIG. 1 may be upgraded to include the electronic display 220, thus becoming the utility box 200 of FIG. 2, in which case the electronic display 220 may instead be disposed on the back of the utility box 200, where there are no doors 110-1, 110-2. Alternatively, the electronic display 220 may be disposed on one of the doors 110-1, 110-2.

The electronic display 220 may, for example, be an electronic paper display such as an electrophoretic (e.g. microencapsulated) display as used on e-readers such as the Amazon® Kindle® e-reader and may, for example, use any of various related technologies employed in products made by E Ink Corporation. In such case, the electronic display 220 may feature a two-pigment, three-pigment, or multi-pigment electronic ink system. The electronic paper display 220 may be sized to fit the first surface 210-1 of the utility box 200 or may be made smaller to occupy only a portion of the first surface 210-1. In the case of electronic paper, the electronic display 220 may have generally low power requirements as compared to other display technologies (e.g. liquid crystal displays), may only require power when the material to be displayed is changed, may require no backlight, and may be readable in direct sunlight. However, the electronic display 220 is not limited to electronic paper and may be implemented as any other type of electronic display technology, such as a light-emitting diode (LED) display, liquid crystal display (LCD) (e.g. LED LCD display), organic light-emitting diode display (OLED), plasma display panel (PDP), electroluminescent display (ELD), quantum dot display, or combination thereof. The electronic display 220 may be used to display information including maps, directions, and other location guidance, information about public transportation, information about the city including upcoming events, art, advertisements, and emergency broadcasts. Through the use of the electronic display 220, each utility box 200 may be part of a city-side network for broadcasting such information and/or targeting specific information to specific locations. While a typical utility box 100 may be thought of by passers-by as a useless obstruction and consequently may be a target of graffiti 90, an improved utility box 200 including an electronic display 220 may be viewed as a civil improvement that serves various functions and engages with people, possibly even instilling civic pride. As such, the utility box 200 may be less likely the target of graffiti 90 and other vandalism.

Figure 3:
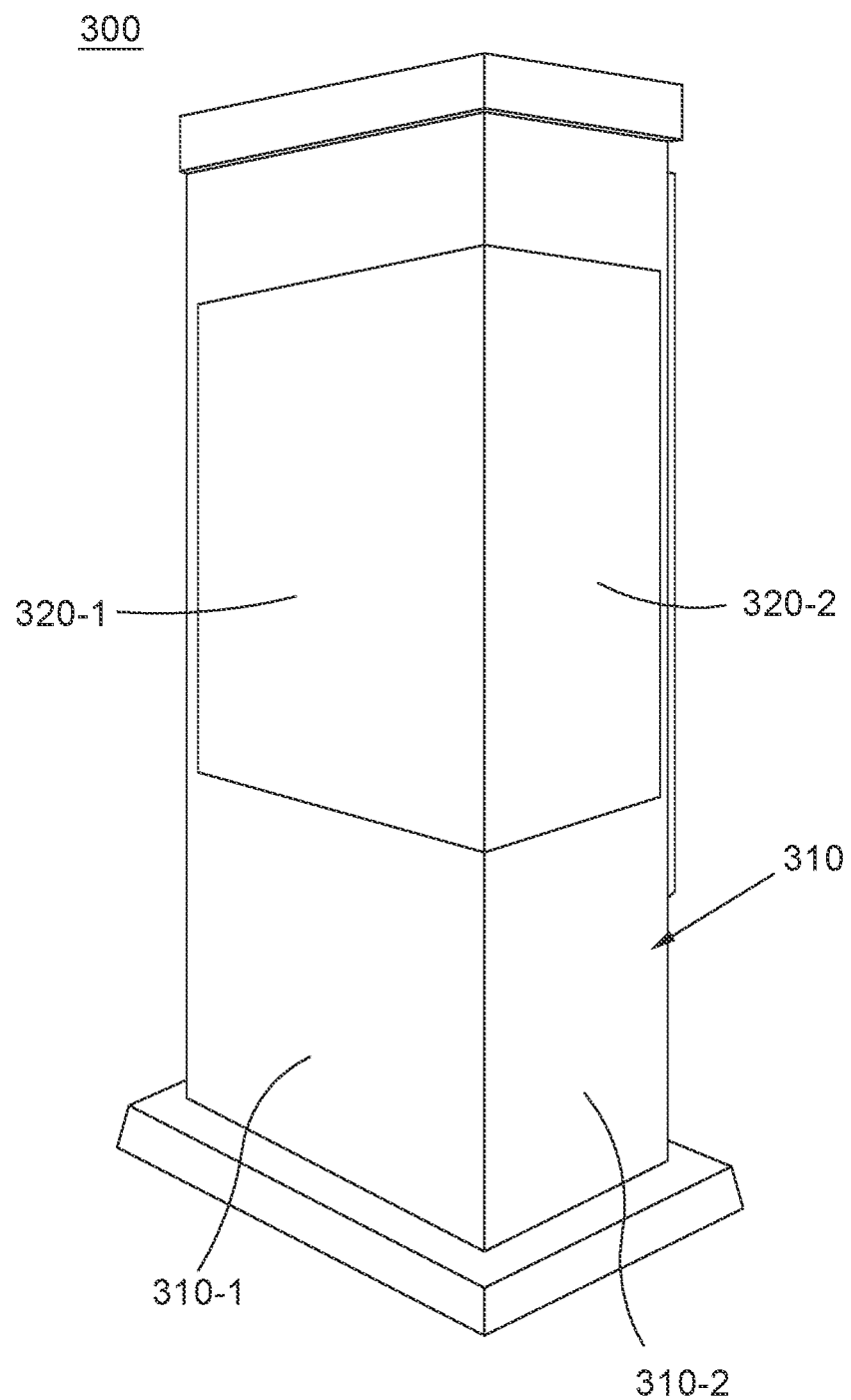
FIG. 3 shows another example of an improved utility box according to an embodiment of the present disclosure.

FIG. 3 shows another example of an improved utility box 300 according to an embodiment of the present disclosure. The utility box 300 may be the same as the utility box 200, including a plurality of external surfaces 310 that are the same as the external surfaces 210 and similarly enclose an interior cavity containing utility equipment. The utility box 300 differs from the utility box 200 in that the utility box 300 includes a plurality electronic displays 320-1, 320-2 on respective external surfaces 310-1, 310-2 of the utility box 300. Such multiple displays may be used to expand the viewing area and allow for more viewers or may be used to display different information on different displays. For example, with the utility box 300 located in front of a restaurant as can be seen in FIG. 3, a first electronic display 320-1 may be used to display various city-related information as described above while a second electronic display 320-2 may be used to display advertisements, promotions, coupons, menu information, etc. associated with the nearby restaurant. Unlike regular paper advertisements, promotions, etc., an electronic display may allow a restaurant or other business to engage in smart coupon advertising, e.g. posting live coupon deals in real time to increase business in times of need. The city may, for example, rent such an electronic display 320-2 out to the local restaurant or other business for a fee (e.g. a monthly rental fee) and allow access to change the display content via a web browser or mobile application. In this way, the utility box 300 may be a source of revenue for the city.

Figure 4:
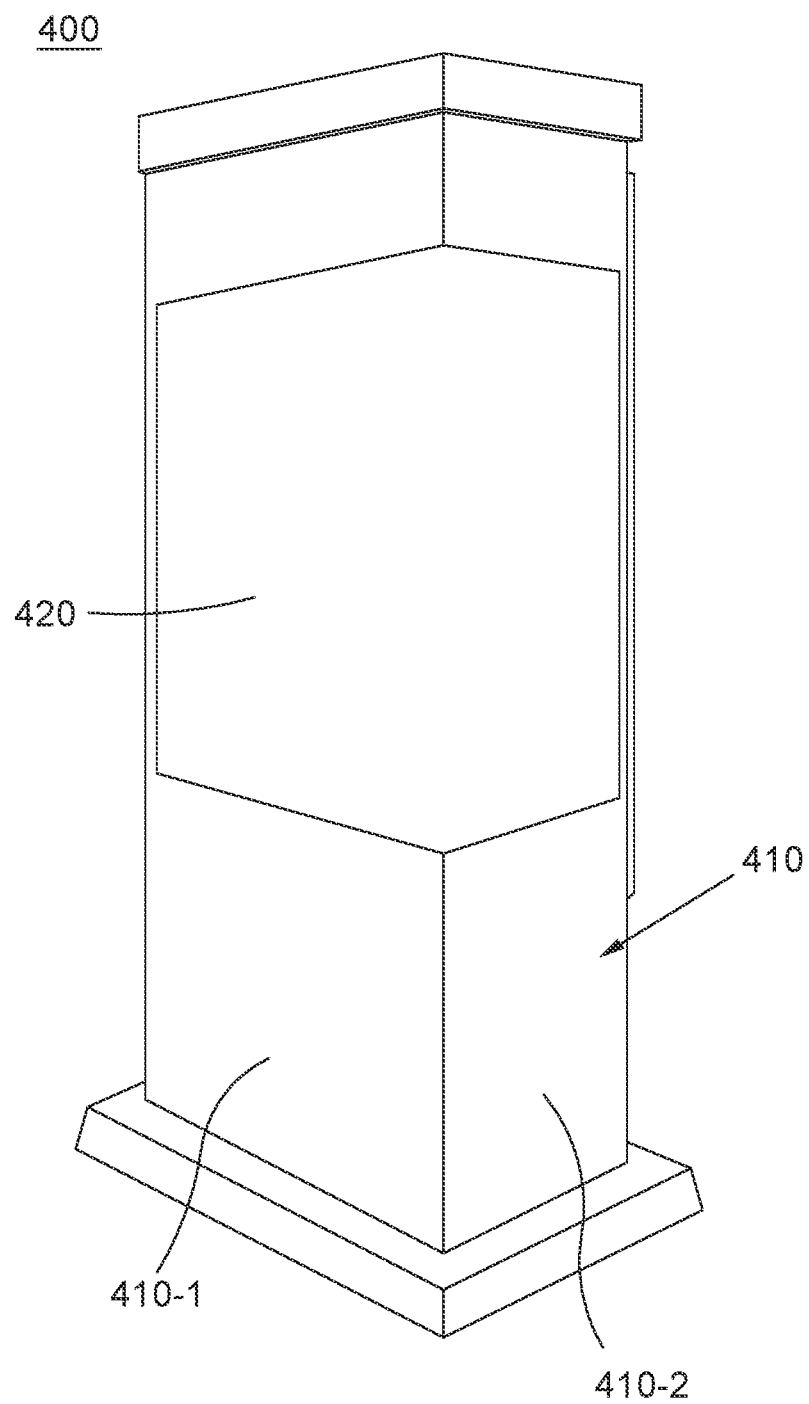
FIG. 4 shows another example of an improved utility box according to an embodiment of the present disclosure.

FIG. 4 shows another example of an improved utility box 400 according to an embodiment of the present disclosure. The utility box 400 may be the same as the utility box 300, including a plurality of external surfaces 410 that are the same as the external surfaces 310 and similarly enclose an interior cavity containing utility equipment. The utility box 400 is a variant of the utility box 300 in that a single, flexible electronic display 420 spans multiple external surfaces 410-1, 410-2 of the utility box 400. To this end, the electronic display 420 may, for example, in the case of electronic paper, be constructed using flexible, plastic-based thin-film transistor technology as used in the E Ink Mobius™ display. As another example, the electronic display 420 may be a flexible organic light-emitting diode (OLED) display or a flexible organic LCD (OLCD) (e.g. a glass-free OLCD). While not separately depicted, it is also contemplated that such a flexible electronic display 420 may be disposed on a single, rounded external surface of a utility box such as a cylindrical, spherical, or domed surface.

Figure 5:
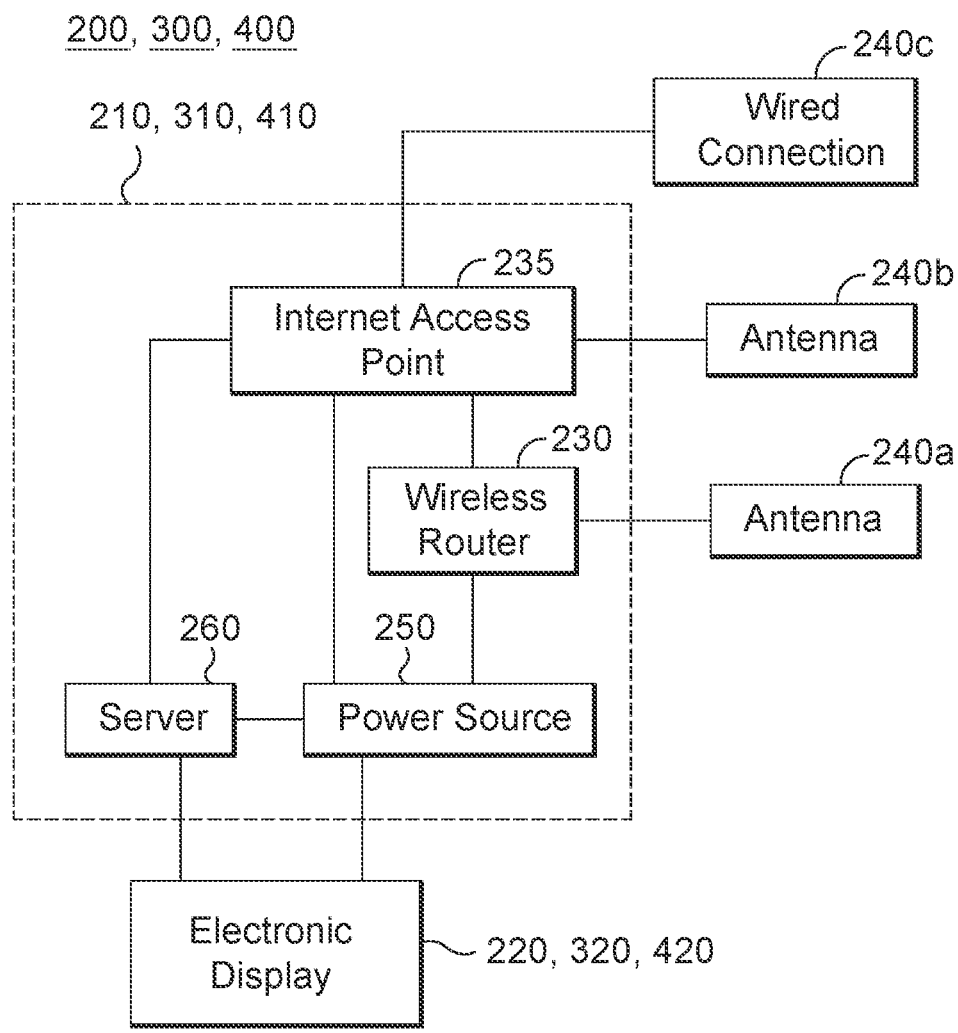
FIG. 5 shows a simplified block diagram of an improved utility box according to an embodiment of the present disclosure.

FIG. 5 shows a simplified block diagram of an improved utility box 200, 300, 400 according to an embodiment of the present disclosure. As depicted schematically with a dashed line, the utility box 200, 300, 400 may include one or more external surfaces 210, 310, 410 for enclosing utility equipment, with an electronic display 220, 320, 420 disposed on the outside of such external surface(s) 210, 310, 410. On the inside of the external surface(s) 210, 310, 410 (i.e. in the interior cavity containing the utility equipment) may be disposed hardware that is used in connection with the electronic display 220, 320, 420 or that provides additional functionality to the utility box 200, 300, 400. For example, the utility box 200, 300, 400 may include a wireless router 230 configured to provide a WiFi hotspot centered at the utility box 200, 300, 400. In a case where such wireless router 230 is disposed within the interior cavity, the wireless router 230 may include one or more antenna elements 240a (e.g. antennas, antenna strips, etc.) that protrude from the interior cavity in order to improve signal reception of the wireless router 230. The same or a different one or more antenna elements 240b (e.g. having different signal frequency for connecting to cellular network) and/or a wired connection 240c (e.g. cable or fiber optic connection) may be used by an Internet access point 235 disposed in the interior cavity of the utility box 200, 300, 400 for connection to the Internet. Configuring the electronic display 220, 320, 420, such as changing the display to show updated artwork, advertising, information, etc. may be controlled by a server 260 disposed in the interior cavity of the utility box 200. Such display updates may be controlled remotely (e.g. via a web browser or mobile application) over the Internet via the Internet access point 235.

The electronic display 220, 320, 420 and/or any wireless router 230, Internet access point 235, server 260, or other hardware may receive power from a power source 250 that is also disposed within the interior cavity of the utility box 200, 300, 400. The power source 250 may be an existing power source associated with the utility equipment or may be a separate additional power source associated only with the electronic display 220, 320, 420, wireless router 230, Internet access point 235, server 260, etc. The power source 250 may be connected to an electric grid or may provide power independent of the electric grid (e.g. from a battery and/or a solar panel on the outside of the utility box 200, 300, 400).

As noted above, a WiFi hotspot may be centered at the utility box 200, 300, 400 in accordance with embodiments of the present disclosure. Such a WiFi hotspot may allow nearby people to obtain Internet access using devices configured in accordance with IEEE 802.11 standards. Providing such Internet access (e.g. for free, for a fee, for registered members, etc.) may further enhance the value of previously underutilized utility boxes 100. Along the same lines, it is further envisioned that improved utility boxes 200, 300, 400 may provide functionality as blockchain portals (e.g. allowing a pedestrian to access the Internet to transact in Bitcoin or other cryptocurrency), as Internet of things (IoT) devices (e.g. collecting localized usage data as part of a city-wide network), as personalized augmented reality displays (e.g. adapting an image or video on the electronic display 220, 320, 420 to each individual person's needs and habits for personal tagged augmented reality marketing), etc.

In the above examples of the improved utility box 200, 300, 400, the external surface(s) 210, 310, 410 may the same surface(s) as an existing external surface(s) of a pre-existing utility box, only modified to include an electronic display 220, 320, 420, etc. as described herein. However, it is also contemplated that the external surface(s) 210, 310, 410 may be surfaces of a structure that is completely external to and encloses an existing utility box, such as a triangular or rectangular frame or a dome that is placed over and outside the existing utility box and includes the electronic display 220, 320, 420 on one or more surface(s) 210, 310, 410 thereon. Such an external frame or dome may include an access door for access to the utility box.

As is well known, infrastructure for providing electrically power is often hidden from plain sight. For instance, a similar utility box 512 including electrical power may be utilized for other uses. One of such examples is that power may be tapped to provide advertising on the utility box utilizing an electronic display as described above. However, the present invention contemplates additional usages for power from the utility box 512 either separately or in combination with the electronic display system. In this regard, the utility box 512 may be used as an operating charging station 510 for vehicles 514, as shown in FIG. 6. For example, as shown in FIGS. 6 and 7, the vehicles 514 may be scooters 516, skateboards 515 and bicycles 518 equipped with electric motors.

As shown in FIGS. 6-12, the charging station 510 may include a charging rack 520. The charging rack 520 may include a vertical portion 522 which includes features that keep the vehicle 514 upright when stored. The charging rack 520 may further include a horizontal portion 524 which includes features which capture a portion of a vehicle 514 which inhibits movement of the vehicle 514. The vertical portion 522 may include two primarily vertically extending posts 526. The posts 526 may be spaced apart from one another. The posts 526 may be connected on a top end portion 528 by a crossbar 530. The crossbar 530 may include separator spines 532 which protrude from the crossbar 530 perpendicular to a longitudinal axis 534 of the crossbar 530. A distance between any two of the separator spines 532 defines a space 536. The space 536 is configured to allow the placement of an upright portion of a vehicle 514 therein. For example, the upright portion may include an upright tube connecting the handlebars to the front wheel of a scooter 516, or a head tube of a bicycle 518.

The horizontal portion 524 may include two extension tubes 538. The extension tubes 538 may be attached at a bottom end portion 540 of the posts 526. The extension tubes 538 may include a connecting ring 542 on a base end portion 544. Each post 526 may be placed in a corresponding one of the extension tube connecting ring 542. The extension tubes 538 may be connected by a capture tube 546 which extends between the remote end portions 548 of the extension tubes 538. The capture tube 546 may further include a padded wrap 550 covering a center portion of the capture tube 546. Scooters 516 may be placed in the charging rack 520 so that the capture tube 546 lifts a rear wheel 552 of the scooter 516 off the ground, preventing the scooter 516 from rolling. If a bicycle 518 is placed in the charging rack 520, a front wheel 554 may be located between the crossbar 530 and capture tube 546, preventing the front wheel 554 from rolling freely.

Both the extension tubes 538 and the posts 526 may have attachment plates 556, which allow the extension tubes 538 and posts 526 to be attached to surfaces. For example, the attachment plates 556 on the posts 526 may be attached to a side 558 of a utility box 512. The extension tubes 538 may be attached to a concrete surface 560 adjacent to the utility box 512. The attachment plates 556 may be connected to a side 558 of the utility box 512 or of the concrete surface 560 using mechanical fasteners. For example, the attachment plates 556 may be attached using screws or a nut and bolt combination. Alternatively, the attachment plates may be attached using an adhesive. Or still further, the attachment plates may be attached using welding.

Figure 10B:
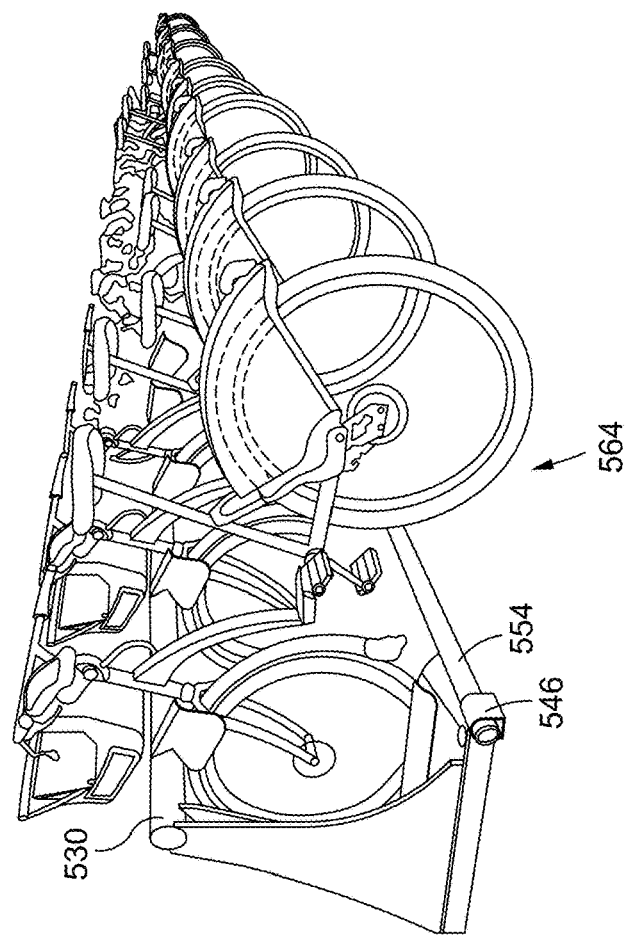
FIGS. 10A and 10B show perspective views of two sections of another charging rack, with FIG. 10A showing a first section for scooters and FIG. 10B showing a second section for bicycles.
Figure 10A:
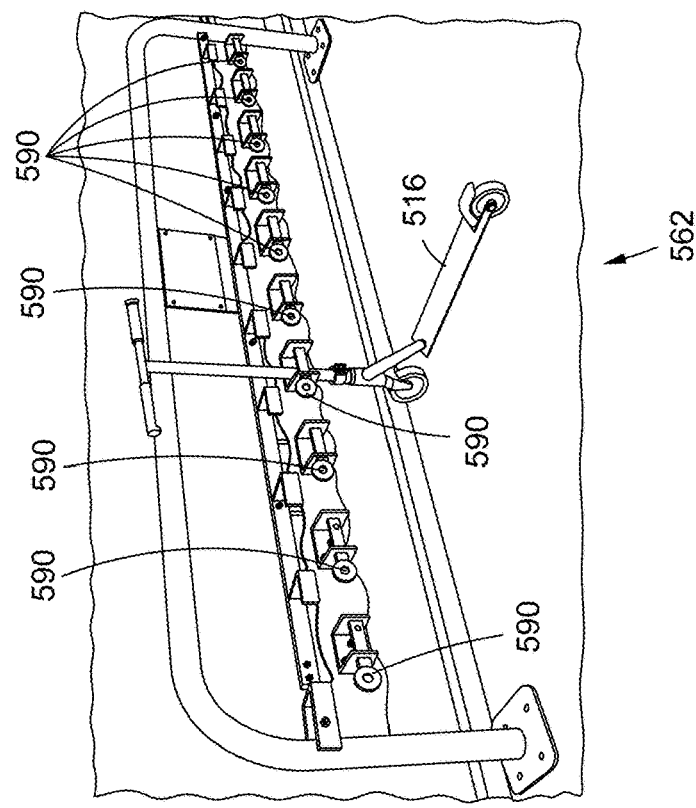
Figure 12:
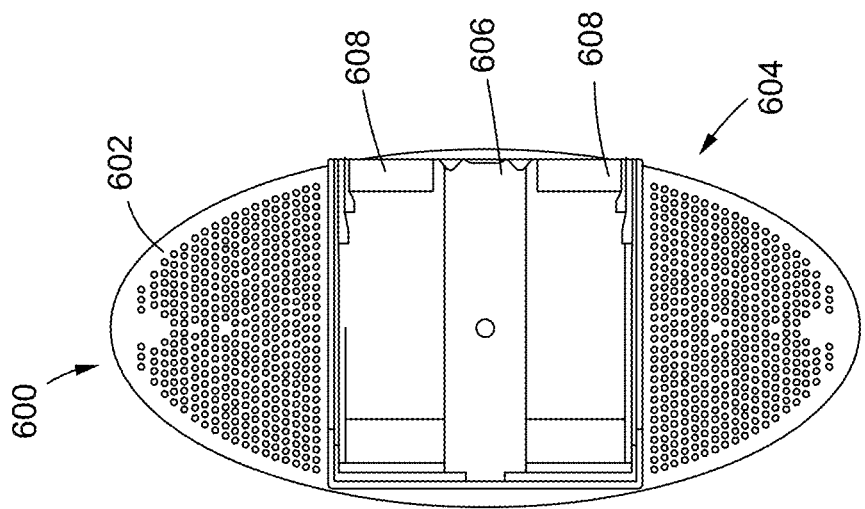
FIG. 12 shows a top plan view of an alternative embodiment of the scooter stand of FIG. 11.
Figure 11:
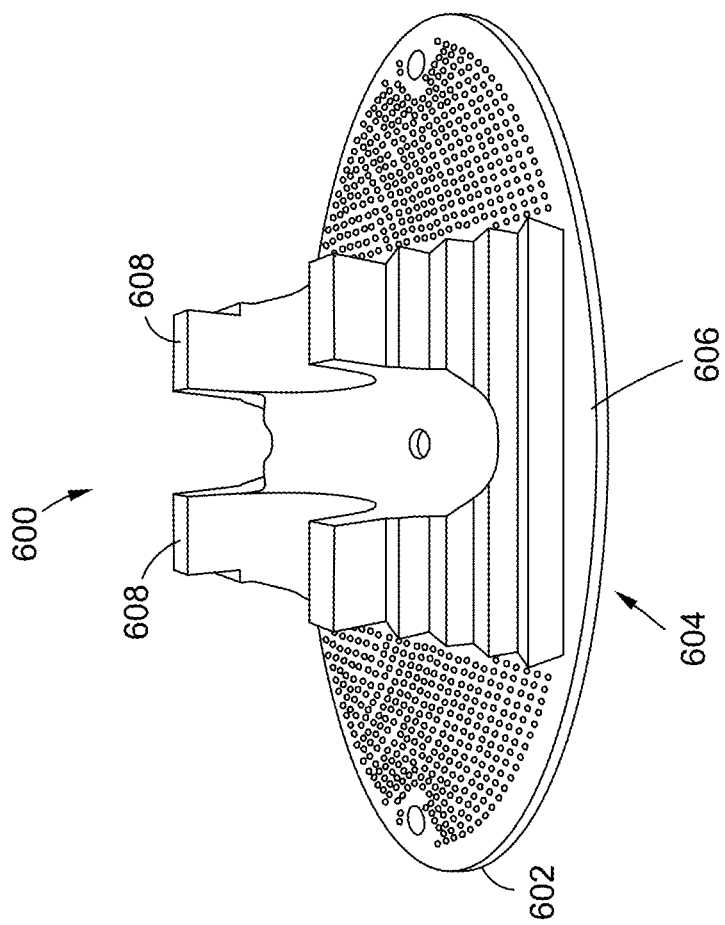
FIG. 11 shows a perspective view of an alternative embodiment of a scooter stand.

As shown in FIGS. 7, 10A, and 10B, the charging rack 520 may have a first section 562 for storing scooters 516 and a second section 564 for storing bicycles 518. Each section 562, 564 may have variations in the configuration of the components. For example, a height of the posts 526 may be greater for the second section 564 in order to allow a portion of the circumference of the front wheel 554 of the bicycle 518 to pass underneath so that the front wheel 554 contacts both the crossbar 530 and the capture tube 546. Similarly, the extension tubes 538 may have a different length in order to locate the capture tube 546 so that when the front wheel 554 of the bicycle 518 contacts both the crossbar 530 and the capture tube 546 simultaneously. The simultaneous contact between the front wheel 554 of the bicycle 518 and the combination of the crossbar 530 and the capture tube 546, prevents the front wheel 554 from rolling or turning freely. Alternatively, the first section 562 may include individual stands 600 for scooters 516 as shown in FIGS. 6 and 7. The individual stands 600 may include a stand plate 602 and a stand body 604. The stand body 604 may include a wheel channel 606 in which the front wheel of the scooter may be placed. The stand body 604 may further include two side recesses 608 which are configured to accommodate the hubs on either side of the front wheel of the scooter 516.

Alternatively, the charging rack may be configured to include only a vertical portion. As shown in FIGS. 7, 10A, and 10B, the first section 562 of the rack includes only a vertical portion. The vertical portion may engage the handlebars of the scooter 516 and a downtube of a bicycle 518.

Additionally, the vertical portion may engage the front wheel of the bicycle 518 as well as the downtube.

The charging rack 520 may include a wireless adapter 568 for adding the charging rack 520 to a local wireless network. For example, the utility box 512 may include a wireless router that may provide a WiFi hotspot centered at the utility box 512. Also, the charging rack 520 may be connected to a wired port 570 in the utility box 512, which provides Internet access. Either a connection to the wireless adapter 568 may provide a blockchain portal for transactions, for example, rental of a vehicle 514 as discussed in further detail below.

The charging rack 520 may be attached to the utility box 512. Alternatively, the charging rack 520 may simply be near enough the utility box 512 to be able to use the power available at the utility box 512.

Provision of power to external vehicles or structures may be integrated in to the charging rack 520. Charging any vehicle 514 in the charging rack 520 may be provided via a plug-in connection 572. The plug-in connection 572 may include a port 574 which interfaces with a jack 576 when the vehicle 514 is placed in the charging rack 520. The port 574 may be located on the vehicle 514, and the jack 576 may be located on the charging rack 520. The jack 576 may be connected to a cable 578 which is connected to the charging rack 520 and thereby to the power from the utility box 512. The cable 578 may be left extended from the charging rack 520 when not connected. Alternatively, the cable 578 may be connected to a retractor (not shown) so the cable 578 is pulled in to an interior of the charging rack 578 when the jack 576 is not connected to the port 574. As a further alternative, the charging rack 520 may include structure so that the jack 576 and port 574 plug directly without the requirement for a cable 578.

As a further alternative, the charging rack 520 may charge the vehicles 514 via induction. The charging rack 520 may include a housing 580 including an induction coil placed in between the extension tubes 538 and the capture tube 546. Alternatively, the capture tube 546 may include an induction coil for inductive charging. The induction coil in either the housing 580 or capture tube 546 would create an alternating electromagnetic filed which interacts with a second induction coil in the vehicle 514 to create a current. The current charges a battery (not shown) in the vehicle 514.

The capture tube 546 may also include one or more sensors 582. The sensors 582 may sense one or more vehicles 514 stored in the rack. These sensors 582 may take any of a number of forms, and more than one type of sensor 582 may be used in combination. For example, the capture tube 46 may include light sensors 584 which are covered by the vehicle 514 when the vehicle 514 is placed in the charging rack 520. When light is blocked from reaching the sensor 584, the sensor 584 indicates that the vehicle 514 is in the position corresponding to the sensor 584 in the charging rack 520. Alternatively, or in addition, the capture tube 546 may include a pressure sensor 586.

The pressure sensor 586 may be connected to a processor (not shown) which is in turn connected to a memory (not shown). The memory may store data indicating the pressure or weight provided by each type of vehicle 514 when the vehicle 514 is placed in the charging rack 520. For example, the memory may store a first pressure for a scooter 516 and a second pressure for a bicycle 518. The first pressure and the second pressure may be multiplied in order to determine how many vehicles 514 total are in the charging rack 520 at any point in time. This data may also be used to determine the mix of vehicles 514 of any particular charging station 510, or an aggregate number of charging stations 510. Each charging station 510 may be connected to a wide area network, for example, the Internet. This connection may be established through the WiFi connection described above. Each charging station 510 may then send data through the wide area network which may be received by system software. The system software may be a software application which receives and reports various status indications sent by each charging station 510. The system software may determine which charging station's 510 data is to be aggregated. As one example, the data may include vehicle 514 mix data. Vehicle 514 mix data may include the number of scooters 516 and bicycles 518 present in the charging rack 520 at any particular charging station 510. For example, all of the vehicle 514 mix data from charging stations 510 in a predetermined city may be aggregated. Alternately, all of the vehicle mix data from charging stations 510 along a specific road may be aggregated, even if that road passes through more than one city. Any number of queries can be written in to the system software or a module provided wherein a user can design their own queries. This vehicle mix data may then be used to determine if vehicles 514 need to be moved to restore a certain type of vehicle 514 to an area which has run low on that particular type of vehicle 514.

Alternately or in addition, a radio frequency identification (RFID) chip (not shown) may be added to each vehicle 514 and an RFID sensor 588 added to the charging rack 520. As each vehicle 514 may have an individual ID, verification of each vehicle's 514 proximity to the charging rack 520 may be determined. This RFID sensor 588, along with the above sensors 582, could help verify the presence of a particular vehicle 514 in a charging rack 520. This RFID sensor arrangement may not be determinative by itself when the vehicle has be locked in the charging rack to end a rental, because RFID is only able to determine proximity. However, the use of an RFID sensor 88 would offer the ability to identify the proximity of a specific vehicle 514, rather than simply the presence of any vehicle 514 or a type of vehicle 514. Depending on the complexity of the deployment of the system, the charging rack 520 may use one or a combination of some of the sensors 582, or may use all the sensors 582 in order to determine the presence of a vehicle 514, a type of vehicle 514, or a particular vehicle 514 in the charging rack 520.

As an alternative to a multiple sensor arrangement, the charging station 510 may include a charging rack 520 and a wireless adapter 568. The vehicles 514 may further include a device which locks the wheels of any vehicle 514 that meets a set of predetermined conditions. The predetermined conditions may include the vehicle 514 having a wireless adapter 592 which is set to automatically join the hotspot created by the charging station wireless adapter 568 on any utility box 512 controlled by the system software. Once the wireless adapter 592 on the vehicle 514 joins the hotspot, the system software may allow a user to end a rental. Once the rental is ended, the wireless adapter 568 on the charging station 510 may send a wireless signal to the wireless adapter 592 on the vehicle 514. The wireless signal may actuate brakes or locks on the wheels which prevent the wheels on the vehicle 514 from turning.

As an alternative to having the vehicle 514 automatically join the wireless hotspot using a vehicle mounted wireless adapter, the charging station 510 may include an RFID sensor 588, and the vehicles a unique RFID chip. When the RFID sensor 588 determines that the RFID chip is in proximity of the RFID sensor 588, the charging station 510 receives a signal from the RFID senor 588 and sends a corresponding signal through the wireless adapter 568 to the system software. In response, the system software changes a setting which allows a renter of the vehicle 514 to terminate the rental.

The charging rack 520 may further include features on the crossbar 530 which allow for locking the vehicle 514 to the charging rack 520. The features may include a locking mechanism 590 may include actuation that is controlled by electronic signals. For example, the locking mechanism 590 may be connectable to other devices via a Bluetooth or WiFi standard wireless connection.

In one embodiment, the user may have software, for example a smartphone application, with which the user may connect with a vehicle rental company. The user may scan an identification code (ID code) located on the locking mechanism 590 on the charging rack 520, the locking mechanism 590 securing a particular vehicle 514 the user wishes to rent to the charging rack 520. The information gained by scanning the locking mechanism 590 may then be sent via the app or stored in a memory of the smartphone. The user may then provide electronic payment information, such as with a credit card, debit card, or other electronic payment service, such as a payment transfer service, or may pay using an alternate currency, such as a cryptocurrency. After the payment is received, the software may send an access code to the smart phone using the app. The access code may then be sent to the charging station 510 by the app through the smartphone to unlock the locking mechanism corresponding to the scanned ID code. The user may then remove the vehicle 514 from the charging rack 520. The process may then be reversed to return the vehicle 514. Return of the vehicle 14 may be verified by the sensors 82 described above, or by other systems.

In one embodiment, the locking mechanism 590 may be mechanical. That is, the locking mechanism may be accomplished using only mechanical means, even if the actuation of the locking and unlocking is done through electronic means. In another embodiment, the locking mechanism 590 may be electromagnetic. That is, the locking of the vehicle itself may be accomplished through an electromagnet. The strength of the electromagnet may be high enough Gauss that essentially no person would be able to remove it from the rack. The current to activate the electromagnet may be turned off and on in a similar manner to the way that the mechanical locking mechanism 590 is actuated. That is, a signal is sent to the locking mechanism 590 which ends provision of current to the locking mechanism 590, allowing a user to remove a vehicle 514 from the locking mechanism 590.

The above description is given by way of example, and not limitation. Given the above disclosure, one skilled in the art could devise variations that are within the scope and spirit of the invention disclosed herein, including various ways of configuring the charging rack. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for providing a multifunctional utility box, the system comprising: a utility box for housing and providing access to utility equipment, the utility box being fixed at an outdoor location and including one or more external surfaces enclosing an interior cavity containing the utility equipment; and an electronic display disposed on a first surface from among the one or more external surfaces, and further comprising a wireless router configured to provide a WiFi hotspot centered at the utility box, and the wireless router is disposed within the interior cavity of the utility box; wherein the wireless router includes one or more antenna elements that protrude from the interior cavity of the utility box.

2. The system of claim 1, wherein the electronic display receives power from a power source disposed within the interior cavity of the utility box.

3. The system of claim 1, wherein the electronic display comprises a liquid crystal display (LCD).

4. The system of claim 1, wherein the electronic display comprises an organic light emitting diode (OLED) display.

5. The system of claim 1, wherein the electronic display comprises an electronic paper display.

6. A method of providing a multifunctional utility box, the method comprising: disposing an electronic display on a first surface from among one or more external surfaces of a utility box that houses and provides access to utility equipment; wherein the utility box is fixed at an outdoor location and the one or more external surfaces enclose an interior cavity containing the utility equipment; further comprising configuring a wireless router to provide a WiFi hotspot centered at the utility box; and further comprising disposing the wireless router within the interior cavity of the utility box, and disposing one or more antenna elements of the wireless router to protrude from the interior cavity of the utility box.

7. The method of claim 6, wherein the electronic display receives power from a power source disposed within the interior cavity of the utility box.

8. The method of claim 6, wherein the electronic display comprises an electronic paper display.

9. A modular system powered by power at a utility box, comprising: an electronic display on the utility box; a charging rack including one or more locking mechanisms connected to the power at the utility box; and a wireless adapter connected to the power at the utility box; wherein the wireless adapter creates a wireless hotspot centered on the utility box.

10. The modular system of claim 9, wherein the charging rack includes spaces for more than one type of vehicle.

11. The modular system of claim 10, wherein the vehicles include scooters and bicycles.

12. The modular system of claim 9, wherein the one or more locking mechanisms are controlled wirelessly.

13. The modular system of claim 9, wherein the charging rack includes one or more wired connections for charging vehicles.

14. The modular system of claim 9, wherein the charging rack includes an induction coil for charging vehicles.

15. The modular system of claim 9, wherein the wireless adapter sends a signal to the one or more locking mechanisms to actuate the one or more locking mechanisms.

16. The modular system of claim 9, wherein the electronic display comprises an electronic paper display.

* * * * *